United States Patent Office 3,005,711
Patented Oct. 24, 1961

3,005,711
TRIPHENYLCARBINOL DYESTUFFS AS PHOTOGRAPHIC ANTIHALATION MATERIAL
Lothar Burgardt, Leverkusen-Bayerwerk, Ottmar Wahl, Opladen, and Helfried Klockgether, Leverkusen, Germany, assignors to AGFA Aktiengesellschaft, Leverkusen, Germany, a corporation of Germany
No Drawing. Filed Nov. 10, 1955, Ser. No. 546,234
Claims priority, application Germany Nov. 12, 1954
5 Claims. (Cl. 96—84)

The present invention relates to photographic materials comprising antihalation layers.

For the production of antihalation layers, it is known to use natural or synthetic resins as binding agents instead of gelatine, so that the layers, although being sparingly soluble or insoluble in water, can be removed owing to their alkali solubility in the alkaline development or processing baths. Such resins, which can be applied from organic solvents, to the support of the light sensitive layers, are for example described in German Patents 584,662, 570,991, and 621,171.

A number of dyestuff groups, including also fuchsone dyestuffs or aurines and benzaurines, have been proposed as dyestuffs for these antihalation layers. Benzaurine and its derivatives, such as halogenated and sulphonated benzaurines, have also been applied as antihalation layers when dissolved in resin solutions.

However, the said dyestuffs have not proved satisfactory in practice as antihalation dyestuffs, since they either have a deficient solubility in the organic solvents from which they are applied together with the resins, or do not show sufficient colour intensity in the organic solvents.

A whole series of conditions are required of the antihalation dyestuffs. Apart from the position of the absorption zones, which may vary according to the purpose of use, it is necessary to have good solubility and high color intensity in order to achieve the required absorption values with a minimum of dyestuff concentration and without deleteriously affecting the properties of the layers themselves. Such a deleterious influence can for example consist in an impairment of the resistance of the layers to being wholly or partially transferred to a material which is held in close contact to said layers (transfer printing strength), or in a lowering of the alkali solubility of the synthetic resin. Furthermore, such dyestuffs must not discolor or diffuse on to the photographic emulsion layers disposed in contact with the antihalation layer and conversely they must also not be decolorized by the influence of the photographic layer which it contacts, for example when the material is stored for a relatively long period. In addition, it is desirable that the dyestuffs do not impair the efficacy of the processing baths, for example do not show any effect on the developer substances, do not color the baths and also do not cause any insoluble residues.

It has now been found that antihalation layers which conform to these requirements can be produced if dyestuffs of the following general formula are used in the form of the free dye acids or the internal salts as antihalation dyestuffs:

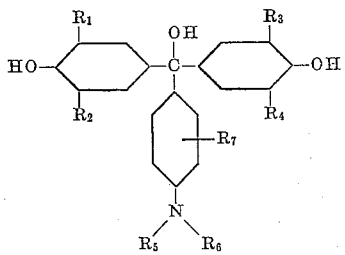

In this general formula:

$R_1$, $R_2$, $R_3$, $R_4$ represent hydrogen, alkyl, such as methyl, ethyl, propyl, aralkyl, hydroxy, alkoxy, such as methoxy, ethoxy, propyloxy, substituted alkyl groups, such as oxalkyl groups, carboxyl groups, nitro groups, halogen atoms such as chlorine, bromine, $R_5$, $R_6$ represent hydrogen, alkyl, aryl, aralkyl, substituted alkyl and aryl groups, such as carboxy-methyl and oxalkyl groups, $R_7$ represents hydrogen, halogen atoms, alkyl, nitro, sulpho or other monovalent organic radicals.

Dyestuffs falling under the above formula include those in which $R_5$ is:

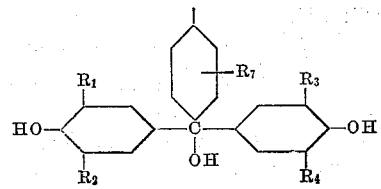

in which the substituents $R_1$, $R_2$, $R_3$, $R_4$, $R_7$ have the same meaning as in the above formula.

In addition to their good solubility and excellent color intensity in organic solvents, such as for example methanol, ethanol, propanol or acetic ester, the dyestuffs of the said structure are characterized by their broadened absorption, which is particularly evident in the lacquer layers described above. Generally speaking, they have two absorption maxima, these being in the green and blue range of the spectrum. Consequently, it is possible with a single dyestuff to produce an efficacy of the antihalation action over practically the entire visible spectrum, that is to say, from about 400 m$\mu$ to about 650 m$\mu$.

These dyestuffs are preferably dissolved in organic solvents which are compatible with the solution of the resinous binding agent compound to be applied or are directly added to the resin solutions. These dyed resin solutions are then applied in the usual manner and dried.

It is furthermore possible to incorporate these dyestuffs in other antihalation layers as for instance those in which the binding agents are not dissolved in the processing bath. Such a binding agent is for instance gelatine. The dyestuffs may also be applied to supports of cellulose derivatives or of high molecular condensation or polymerization products. In this case the dyestuffs are dissolved in known manner in solvents which have a swelling action on said supports, whereafter these solutions are used for dyeing said supports. However, we wish to point out, that the incorporation of the dyestuffs into antihalation layer the binding agents of which consist of the above disclosed resins is the preferred mode of realizing the present invention.

The production of the dyestuffs claimed is effected by known methods, for example by condensation of two mols of a phenol, cresol, a phenol carboxylic acid etc. with a p-amino-benzaldehyde substituted in a manner corresponding to the general formula to form the leuco compound and oxidation of the leuco compound, for example with nitrite, to form the dye base. Suitable as aminobenzaldehydes are, for example, p-N-β-chlorethyl-N-methyl-aminobenzaldehyde,
p-N-di(β-chlorethyl)aminobenzaldehyde,
p-N-di(oxethyl)-aminobenzaldehyde,
p-N-methyl-N-oxyethyl-aminobenzaldehyde,
N-(β-diethylaminoethyl)-p-amino-benzaldehyde, 3-methyl-4-dimethylaminobenzaldehyde,
p-N-ethyl-N-phenylaminobenzaldehyde,
p-N-methyl-N-(ω-carboxymethyl),
p-dimethyl- and p-diethyl-amino-benzaldehydes,
2-chloro-4-N-dimethylamino-benzaldehyde,
p-N-butyl-N-hydroxyethylamino-benzaldehyde,
N-ethyl-N-p-ethoxyphenyl-amino-benzaldehyde or
N-methyl-N-p-tolylamino-benzaldehyde.

Furthermore dialdehydes of the N-alkyldiphenylamine, such as p-p'-diformyl-N-ethyl-(or methyl)-diphenylamine, may be used. In this case 1 mol of the dialdehyde is reacted with 4 mols of a phenol. These dyestuffs are distinguished by a very high gray content.

Suitable phenols for the production of the dyestuffs are for instance: phenol, o-chlorophenol, o-bromophenol, o-cresol, pyrocatechol, pyrocatechol monomethylether, 2.6-dimethyl- or 2.6-diethyl-phenol, salicylic acid, o-cresotinic acid, 3-chloro- or 3-bromosalicylic acid, 3-nitrosalicylic acid.

The dyestuffs claimed can also be used in admixture with other dyestuffs already known for this purpose. This is done for the purpose of widening the absorption range. Alkali-soluble, natural or synthetic resins or polycondensation and polymerization products are preferably used as binding agents for the antihalation layers. Examples of polymerization products of this type are: polyacrylic acid, polymethyacrylic acid, polystyrene-carboxylic acid, copolymers of vinyl chloride and acrylic acid, vinyl chloride and maleic acid or maleic anhydride, acrylonitrile and styrene-carboxylic acid, styrene and maleic acid.

*Example 1*

10 g. of a dyestuff of the following constitution:

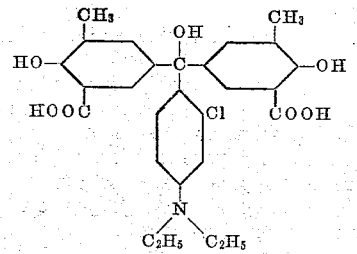

and 30 g. of a polymerization product of vinyl butyl ether and maleic anhydride, which is soluble in an alkaline development bath are dissolved in 1.5 litres of alcohol.

After the layer has been applied and dried, there is obtained an antihalation layer having an absorption which extends over the entire blue and green zones of the spectrum as well as a part of the red zone. The two absorption maxima are 575 and 490 m$\mu$. Owing to the alkali solubility of the binding agent, the layer is dissolved out in the developer bath, the dyestuff being simultaneously decolorized.

The above dyestuff is obtained as follows:

21 g. of o-chlor-p-diethylaminobenzaldehyde (1 mol), 33.5 g. of o-cresotinic acid (2 mol) are added to 175 g. of 90% sulfuric acid, the mixture is agitated for 10 hours at 15–20° and then for 10 hours at 25–30° C. Thereafter, 100 g. of monohydrate are added. To the mixture there are added during 5 hours at 15–20° in small charges 3.5 g. sodiumnitrate. After agitating the reaction mixture for 15 hours at 20–25° C., it is poured into 1.2 litres of water, the precipitate sucked off, washed with water until neutral and dried under diminished pressure at 50–60° C. Yield 54 g.

*Example 2*

A dyestuff of the following constitution:

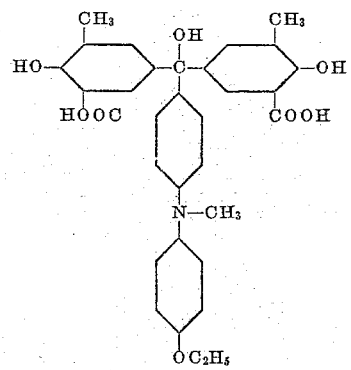

can also be used instead of the dyestuff mentioned in Example 1.

This dyestuff is prepared by a process analogous to that of Example 1 by condensation of 33.5 g. of o-cresotinic acid and 26.5 g. of N-methyl-N-(p'-ethoxy-phenyl)-p-amino-benzaldehyde. The latter may be prepared according to the method of Vilsmeier and Haack (Ber. 60, 190). After recrystallization from alcohol it melts at 121–123° C. The dyestuff has an absorption which extends over the whole visible spectrum and part of the ultraviolet spectrum. Absorption maxima: 560 and 470 m$\mu$.

*Example 3*

5–10 g. of a dyestuff having the following constitution:

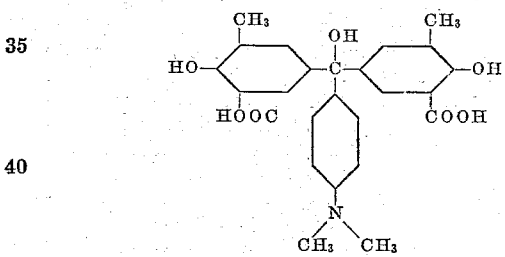

are dissolved in 1.5 litres of a 3% alcoholic solution of the resinous condensation product of phenoxy-acetic acid and p-cresol dialcohol which is soluble in alkaline development bath and applied with this solution in known manner as the backing layer to a layer support. The dyestuff is obtained according to Example 1 by condensing 33.5 g. of cresotinic acid and 14.9 g. of p-dimethylamino-benzaldehyde.

*Example 4*

15 g. of a dyestuff having the following constitution:

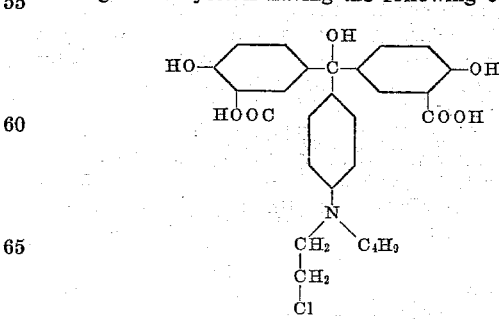

are dissolved in 1.5 litres of a 2% ethanolic solution of a polymerization product of vinyl ethyl ether and maleic anhydride which is soluble in an alkaline development bath and applied as the backing layer to a support carrying a silver halide layer in the usual manner. The backing layer has a violet color and an absorption region from about 400 to about 620 m$\mu$.

The dyestuff is obtained in the following manner:

27.0 g. of p-(N-butyl-N-ω-chlorethylamino)benzaldehyde and
30.5 g. of salicylic acid are condensed as in Example 1 in
175 g. of 20% sulfuric acid and oxidized with
3.5 g. of sodiumnitrite after addition of
100 g. of monohydrate.

The above aldehyde is obtained according to the process disclosed in German specification No. 711,665.

Example 5

A good antihalation effect, the efficacy of which extends over the entire range of sensitivity of a panchromatic film, is obtained in the following manner:

1.5 litres of a 3% alcoholic solution of the resinous condensation product of phenoxy acetic acid and formaldehyde have dissolved therein:

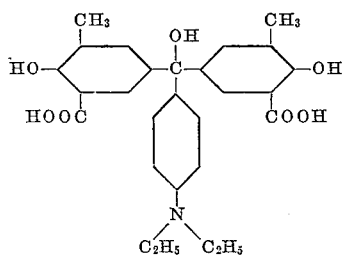

and also 1.5 g. of a green dyestuff of the following constitution:

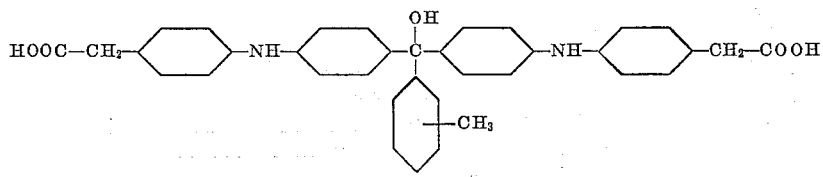

The solution is applied to the back of a support the front-side of which carries a silver halide emulsion layer in the usual way and dried. The absorption of this layer extends over the entire range of the visible spectrum and into the infra-red range.

The dyestuff of the first formula is prepared according to Example 1 by condensation of 17.7 g. of p-diethylaminobenzaldehyde and 33.5 g. of o-cresotinic acid.

Example 6

Instead of the dyestuff of Example 4 a dyestuff of the following formula may be used:

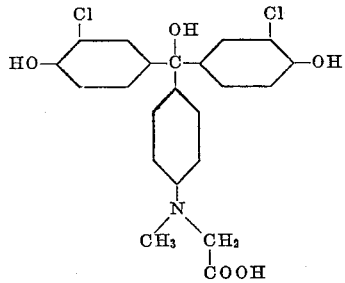

The dyestuff is produced as in Example 1 using:

19.3 g. of N-methyl-N-ω-carboxymethylaminobenzaldehyde (melting point 200–202° C.),
18 g. of o-chlorophenol. It is of intensive red color.

Example 7

If the two dyestuffs of Example 5 are replaced by 8–10 g. of a dyestuff of the formula:

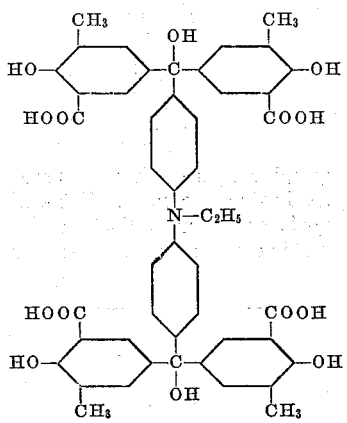

an antihalation action is obtained, which extends over the whole visible spectrum.

This dyestuff is prepared as follows:

12.7 g. N-ethyl-p-p'-diformyldiphenylamine and
33.5 g. of o-cresotinic acid are condensed as described in Example 1 in
175 g. of 90% sulfuric acid and oxidized with
3.5 g. of nitrite after addition of
100 g. of monohydrate. Yield: 44 g.

N-ethyl-p-p'-diformyldiphenylamine is prepared as follows:

240 g. of phosphorus oxychloride and
150 g. of dimethylformamide are mixed with cooling. After one hour
100 g. of ethyldiphenylamine are dropped into the mixture which is stirred at 80° C. for five hours and introduced into water at 40° C. After several hours' stirring the resultant oily aldehyde solidifies. The aldehyde is filtered off with suction and recrystallized twice from alcohol. Yield: 95 g. (M.P. 73–74° C.).

Instead of the abovesaid dyestuff, dyestuffs may be used wherein N-ethyl-p,p'-diformyl-diphenylamine is replaced for instance by N-methyl-p,p'-diformyl-diphenylamine, p,p'-diformyldiphenylamine-N-acetic acid or p,p'-diformyldiphenylamine-N-proprionitrile. Instead of cresotinic acid, one of the other above mentioned phenol substances may be used to produce symmetrical dyestuffs, as far as said phenol substances yield dyestuffs of the required solubility properties. As examples may be mentioned pyrocatechol, salicyclic acid, 3-chloro-salicylic acid and o-cresol.

What we claim is:

1. A photographic light-sensitive material comprising a film support having thereon a light-sensitive silver halide emulsion layer and an antihalation layer containing a light-absorbing dyestuff having the formula:

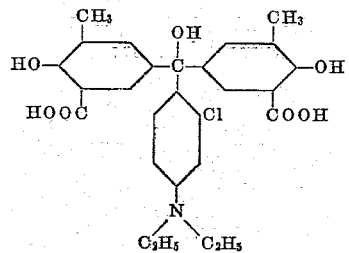

2. A photographic light-sensitive material comprising a film support having thereon a light-sensitive silver halide emulsion layer and an antihalation layer containing a light-absorbing dyestuff having the formula:

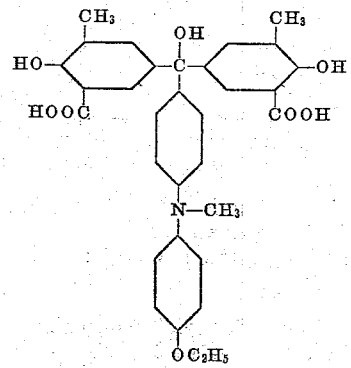

3. A photographic light-sensitive material comprising a film support having thereon a light-sensitive silver halide emulsion layer and an antihalation layer containing a light-absorbing dyestuff having the formula:

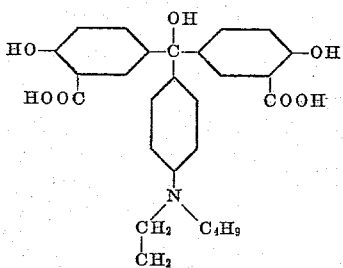

4. A photographic light-sensitive material comprising a film support having thereon a light-sensitive silver halide emulsion layer and an antihalation layer containing a light-absorbing dyestuff having the formula:

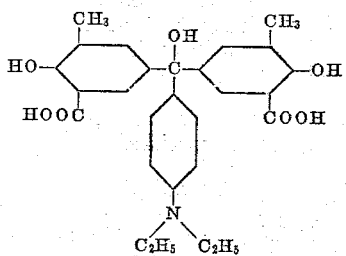

5. A photographic light-sensitive material comprising a film support having thereon a light-sensitive silver halide emulsion layer and an antihalation layer containing a light-absorbing dyestuff having the formula:

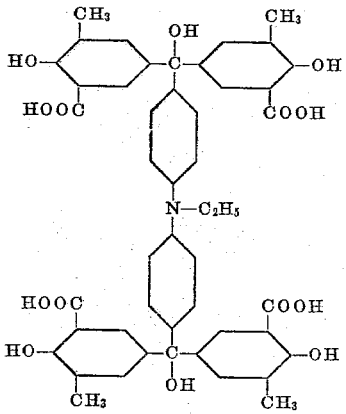

References Cited in the file of this patent

UNITED STATES PATENTS

| | | |
|---|---|---|
| 1,747,541 | Francke | Feb. 18, 1930 |
| 2,350,090 | Beilenson | May 30, 1944 |
| 2,462,534 | Murray | Feb. 22, 1949 |

FOREIGN PATENTS

| | | |
|---|---|---|
| 1,001,943 | France | Oct. 31, 1951 |